US009174337B2

(12) United States Patent
Buchner

(10) Patent No.: US 9,174,337 B2
(45) Date of Patent: Nov. 3, 2015

(54) SADDLE COUPLING AND SADDLE BASE ASSEMBLY FOR USE WITH POWER HAND TOOLS

(76) Inventor: David Buchner, Janesville, WI (US)

(*) Notice: Subject to any disclaimer, the term of this patent is extended or adjusted under 35 U.S.C. 154(b) by 438 days.

(21) Appl. No.: 13/571,617

(22) Filed: Aug. 10, 2012

(65) Prior Publication Data

US 2014/0042292 A1 Feb. 13, 2014

(51) Int. Cl.

| | |
|---|---|
| ***F16M 1/00*** | (2006.01) |
| ***F16M 3/00*** | (2006.01) |
| ***F16M 5/00*** | (2006.01) |
| ***F16M 7/00*** | (2006.01) |
| ***F16M 9/00*** | (2006.01) |
| ***F16M 11/00*** | (2006.01) |
| ***B25H 1/00*** | (2006.01) |

(52) U.S. Cl.

CPC .................................... *B25H 1/0035* (2013.01)

(58) Field of Classification Search

CPC ...................................................... B25H 1/0021
USPC ............ 248/518, 219.4, 222.11, 222.51, 664, 248/669, 652, 653, 654, 655; 30/296.1; 173/149, 104, 55, 164; 172/14, 15
See application file for complete search history.

(56) References Cited

U.S. PATENT DOCUMENTS 1,674,669 A * 6/1928 Stedman ........................ 408/235
2,405,110 A * 8/1946 Bullock ......................... 173/141
2,625,063 A * 1/1953 Hanson ........................... 408/95
2,643,088 A * 6/1953 Hornack ........................ 173/152
2,667,317 A * 1/1954 Trebules ........................ 248/514
2,720,125 A * 10/1955 Palik ............................ 254/106
2,917,953 A * 12/1959 Badali ....................... 254/93 HP
2,997,900 A * 8/1961 Pugsley .......................... 408/95
3,291,356 A * 12/1966 Armstrong ...................... 227/82
3,724,790 A * 4/1973 Harris et al. .................. 248/642
3,890,058 A * 6/1975 Self et al. ...................... 408/112
4,479,599 A * 10/1984 Conrad ............................ 227/9
4,572,715 A * 2/1986 Wolff ........................... 409/180
4,641,395 A * 2/1987 Banks ............................ 16/348
4,736,804 A * 4/1988 Geibel ............................ 173/30
5,029,799 A * 7/1991 Bernier ......................... 248/514
5,295,620 A * 3/1994 Cousineau et al. ........... 227/156
5,411,238 A * 5/1995 Caron ........................... 248/664
5,820,317 A 10/1998 Van Troba (Continued)

FOREIGN PATENT DOCUMENTS

DE 102006029611 A1 * 12/2007 ............ F16M 11/18
JP 2004276152 A * 10/2004 ............. B23B 45/14

*Primary Examiner* — Jonathan Liu
*Assistant Examiner* — Muhammad Ijaz
(74) *Attorney, Agent, or Firm* — Joseph S. Heino; Patrick M. Bergin

(57) ABSTRACT

A saddle coupling and saddle base assembly is provided for use with power hand tools. The assembly is mounted atop a variably-adjustable stand for drilling holes or inserting fasteners into concrete ceilings, drywall ceilings or other overhead surfaces. The assembly comprises a saddle base and a saddle coupling that is removably attachable to the saddle base. The saddle coupling is configured to attach a single power hand tool or a plurality of power hand tools to the coupling. A plurality of like-configured saddle couplings can be attached to different power hand tools to allow the user to quickly and easily remove one saddle coupling and power hand tool and replace it for another. A spring-loaded locking feature is included in the assembly as a primary securement means for the assembly. A secondary securement means is also provided in the event of a failure of the primary means.

3 Claims, 5 Drawing Sheets

(56) References Cited

U.S. PATENT DOCUMENTS

| | | | | |
|---|---|---|---|---|
| 5,941,497 | A * | 8/1999 | Inoue et al. | 248/514 |
| 6,095,724 | A | 8/2000 | Hurt | |
| 6,484,987 | B2 * | 11/2002 | Weaver | 248/278.1 |
| 6,692,201 | B2 * | 2/2004 | Soderman | 408/111 |
| 6,860,682 | B1 * | 3/2005 | Le Picq | 408/112 |
| 6,901,695 | B2 * | 6/2005 | Lindroth | 47/1.43 |
| 7,004,284 | B2 * | 2/2006 | Chick | 182/16 |
| 7,093,366 | B2 * | 8/2006 | Black | 30/296.1 |
| 7,228,917 | B2 | 6/2007 | Davis et al. | |
| 7,703,211 | B1 * | 4/2010 | Kirchhoff | 30/296.1 |
| 7,789,353 | B2 | 9/2010 | Koerlin et al. | |
| 8,167,250 | B2 * | 5/2012 | White | 248/49 |
| 2007/0267532 | A1 * | 11/2007 | Phelps | 242/596 |
| 2011/0150590 | A1 | 6/2011 | Buchner | |
| 2011/0255929 | A1 * | 10/2011 | Buchner | 408/137 |
| 2012/0091300 | A1 * | 4/2012 | Bee et al. | 248/219.4 |

* cited by examiner

SADDLE COUPLING AND SADDLE BASE ASSEMBLY FOR USE WITH POWER HAND TOOLS

FIELD OF THE INVENTION

The present invention relates generally to power hand tools of the type that are used for drilling or cutting into surfaces. More specifically, the present invention relates to a power hand tool saddle coupling and saddle base assembly that can be used with a movable stand for supporting and variably elevating at least one power hand tool proximate to an overhead surface for drilling, nailing or cutting into such surface.

BACKGROUND OF THE INVENTION

There are many applications where it is necessary to drill, nail or cut into an overhead surface, such as a concrete ceiling or a drywall ceiling. Such overhead surfaces can vary in their height from the floor. For example, before installing fasteners into concrete ceilings for overhead surfaces, it is usually necessary to first drill holes. Such holes are typically drilled using a hand-held power drill. In most applications, many such holes must be drilled within a single area. This means repetitive use and repositioning of the drill by the user. This repetitive overhead drilling creates a great deal of physical strain for a worker because, not only must the worker support the weight of the drill, but the worker must apply upwardly drilling force as well.

A fundamental problem with this type of work is reaching the overhead surface in the first place. In order to do that, the worker must typically construct scaffolding or ascend a ladder or other elevating device to drill each hole. For taller ceilings, a ladder may not reach or, because obstacles may not be able to be placed directly under the surface to be drilled or close enough to the drilling surface, the worker must dangerously overextend to drill the holes. In addition, standing on a ladder or other elevating device places the worker in close proximity to the dust and debris associated with the drilling of overhead concrete or other surfaces.

Stands for supporting a drill are known in the art. One example is disclosed in U.S. Pat. No. 6,095,724 (Hurt '724). For height adjustment, the stand taught by Hurt '724 uses a lever pivotally connected at a pivot point to a support collar, which is connected to the lower end of an outer column. An inner column is slidably located within the outer column. A linkage pivotally connects the lever to a locking compression collar and locking clamp. To adjust the height of the drill stand, the worker must unlock the locking clamp and then manually slide, in unison, the locking compression collar and locking clamp, the linkage, the support collar and outer column, and the lever upward or downward on the inner column, all while holding the inner column steady by positioning one of his or her feet on a foot plate. When the desired position is reached, the worker must manually lock the locking clamp.

The height adjustment and locking mechanism taught by Hurt '724 is not desirable because it is cumbersome to use. The worker must use both of his or her hands to move all the necessary components and at least one of his or her feet to steady the drill stand. When the selected height is reached, the worker must remove one of his or her hands from the adjustment and locking mechanism components to lock the locking clamp, while supporting all components with the remaining hand. In addition, drill stand taught by Hurt '724 must be picked up and carried from one drilling location to the next. Further, the drill stand of Hurt '724 does not use, teach or suggest the use of a structure that can be used to quickly and easily remove the power hand tool from atop the stand such that a second power hand tool can replace the first. This inventor has overcome these shortcomings as is described in greater detail in his co-pending application, U.S. Pub. No. US 2011/0255929 titled Universal Drill Stand, which application is incorporated herein by reference.

In view of the foregoing, however, this inventor has found that it is also desirable to have an assembly that is easily mounted to the top of a height-adjustable power hand tool stand. It is also desirable to have such an assembly where a first power hand tool can quickly and easily be removed and replaced with a second such tool. It is also desirable to have such an assembly where a plurality of hand tools can be used simultaneously. Further, it is desirable to have such an assembly that secures the power hand tool, or the plurality of hand tools, in a way that provides safety redundancy and ensures that the power hand tool or tools cannot be removed unless such is desired or required.

SUMMARY OF THE INVENTION

The present invention is a saddle coupling and saddle base assembly for use with power hand tools. The assembly is mounted to the top of a variably-adjustable stand for drilling holes or inserting fasteners in concrete ceilings or other overhead surfaces. The assembly comprises a saddle base and a saddle coupling that is removably attachable to the saddle base. A plurality of like-configured saddle couplings can be attached to different power hand tools, providing the user with quick and easy capabilities for removing one saddle coupling and power hand tool for another. A single saddle coupling could also allow the user to use the single coupling with a plurality of power hand tools. A spring-loaded locking feature is included in the assembly of the present invention. This is a primary securement means of the assembly. A secondary securement means is also provided in the event of a failure of the primary means.

The foregoing and other features of the saddle coupling and saddle base assembly of the present invention will be apparent from the detailed description that follows.

DETAILED DESCRIPTION

Figure 1:
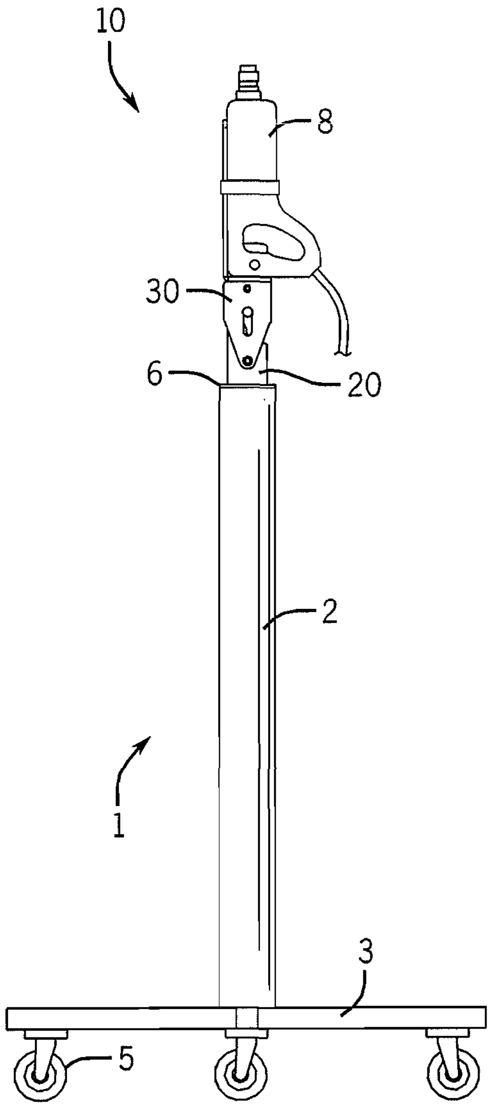
FIG. 1 is a left side elevational view of the saddle coupling and saddle base assembly that is constructed in accordance with the present invention and attached to a stand, the assembly shown in a first vertical position.
Figure 2:
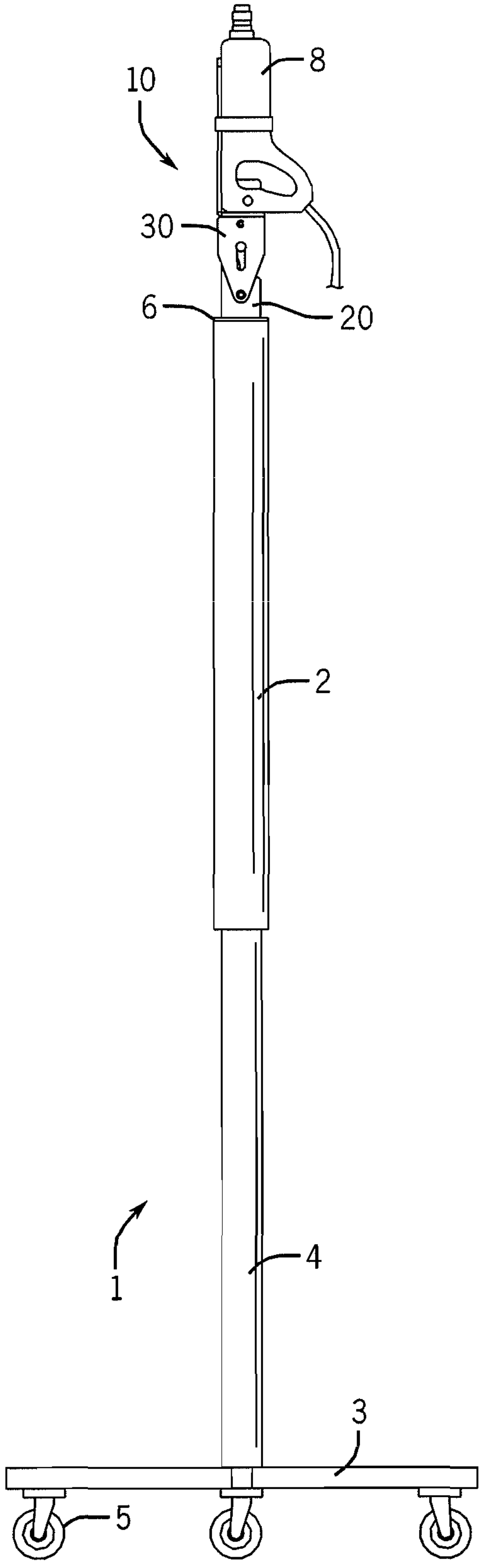
FIG. 2 is the same view as that shown in FIG. 1 and illustrating the assembly in an elevated second vertical position.

Referring now to the drawings in detail, wherein like numbered elements refer to like elements throughout, FIGS. 1 and 2 illustrate side elevational views of an exemplary embodiment of the saddle coupling and saddle base assembly, generally identified 10, that is constructed in accordance with the present invention. The assembly 10 is configured to be mounted atop a movable stand 1. The stand 1 comprises a first vertically-disposed tubular section 2 that is attached to a base 3, the base comprising wheels or casters 5 which allow for movement of the stand 1 about a work area having a ceiling surface (not shown). The first tubular section 2 is vertically movable relative to the base 3 and a second tubular section 4. It is to be understood that the precise configuration of the stand 1 is not a limitation of the present invention. For example, the stand 1 could comprise the like structure numbered 100 in applicant's co-pending application, U.S. Pub. No. US 2011/0255929 titled Universal Drill Stand. Further, the stand 1 could comprise a pneumatically-actuated means for elevating the first tubular section 2 such that the power hand tool 8 is elevated or lowered relative to the ceiling of a work area. The assembly 10 is perched atop, or at an upper portion of, the first tubular section 2 by means of a tube cap 6. See also FIG. 3. The tube cap 6 is used to provide a fastening surface for the saddle coupling and saddle base assembly 10.

Figure 3:
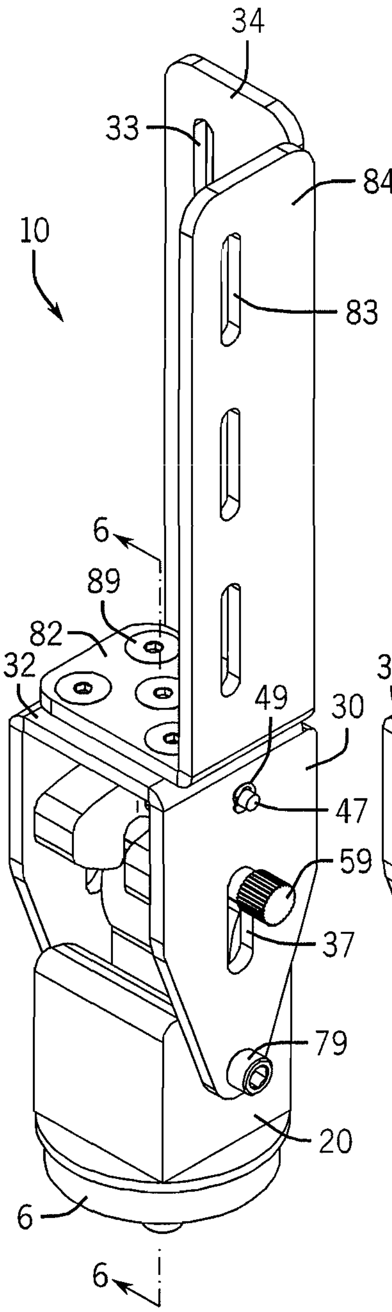
FIG. 3 is an enlarged top, front and right side perspective view of the saddle coupling and saddle base of the assembly as attached to one another.
Figure 4:
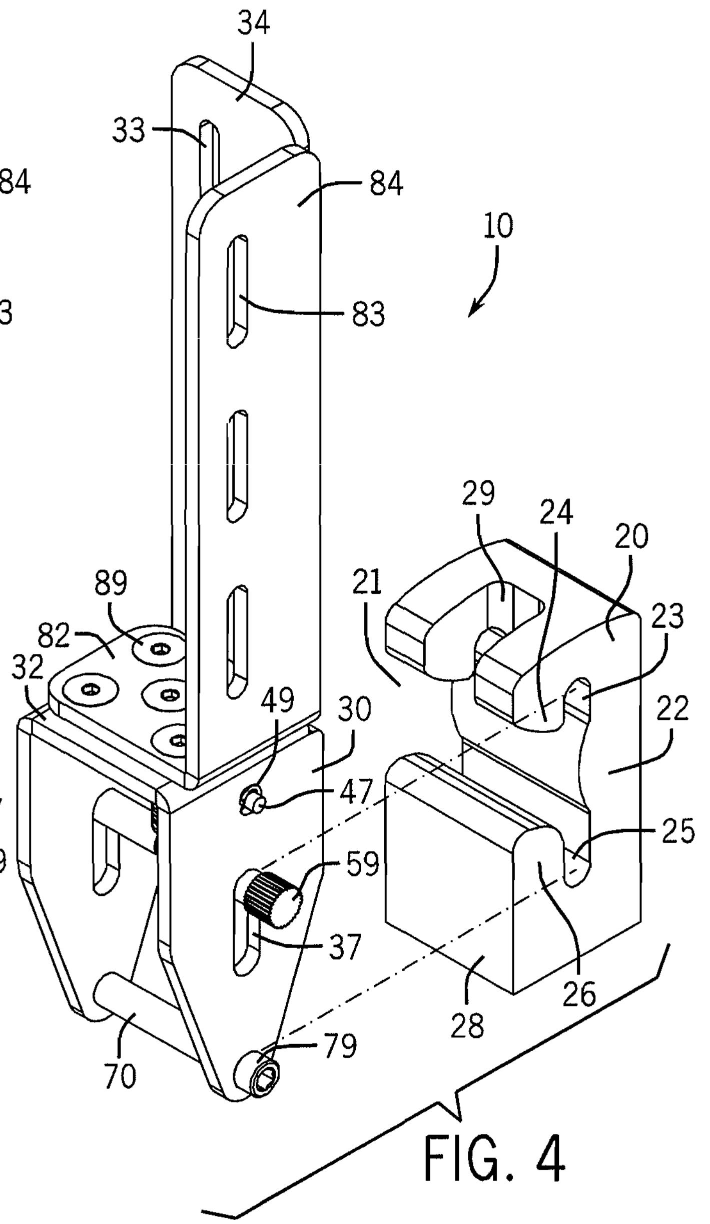
FIG. 4 is a view similar to that shown in FIG. 3 and showing the saddle coupling and saddle base of the assembly as detached from one another.

Continuing with reference to FIGS. 3 and 4, it will be seen that the assembly 10 comprises a saddle base, generally identified 20, and a saddle coupling, the coupling being generally identified 30. The base 20 and the coupling 30 are configured such that the coupling 30 can be securely, but removably, attached to the base 20.

Figure 9:
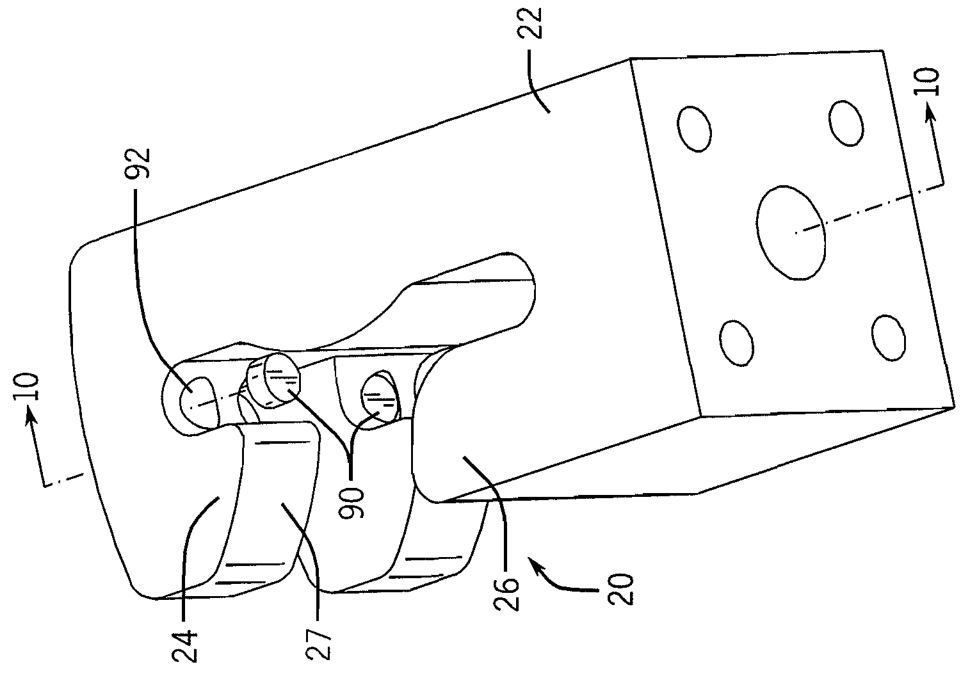
FIG. 9 is a bottom, front and right side perspective view of the saddle base of the assembly.

In the preferred embodiment of the saddle base 20 of the present invention, it will be seen in FIG. 4 that the base 20 comprises a base body 22 having a front face 28 with a front face opening 21 defined in it. The opening 21 further comprises a top horizontally-disposed receiving slot 23 and a bottom horizontally-disposed receiving slot 25. Forward of the top receiving slot 23 of the base body 22 is a top base protrusion 24. The top base protrusion 24 extends substantially downwardly in relation to the base opening 21. The top base protrusion further comprises a bottom surface 27. See FIG. 9. Forward of the bottom receiving slot 25 is a bottom base protrusion 26 that extends substantially upwardly in relation to the base opening 21. A top base opening 29 is also defined within the base body 22. Other structure of the base 20 will be referenced later in this detailed description.

Figure 5:
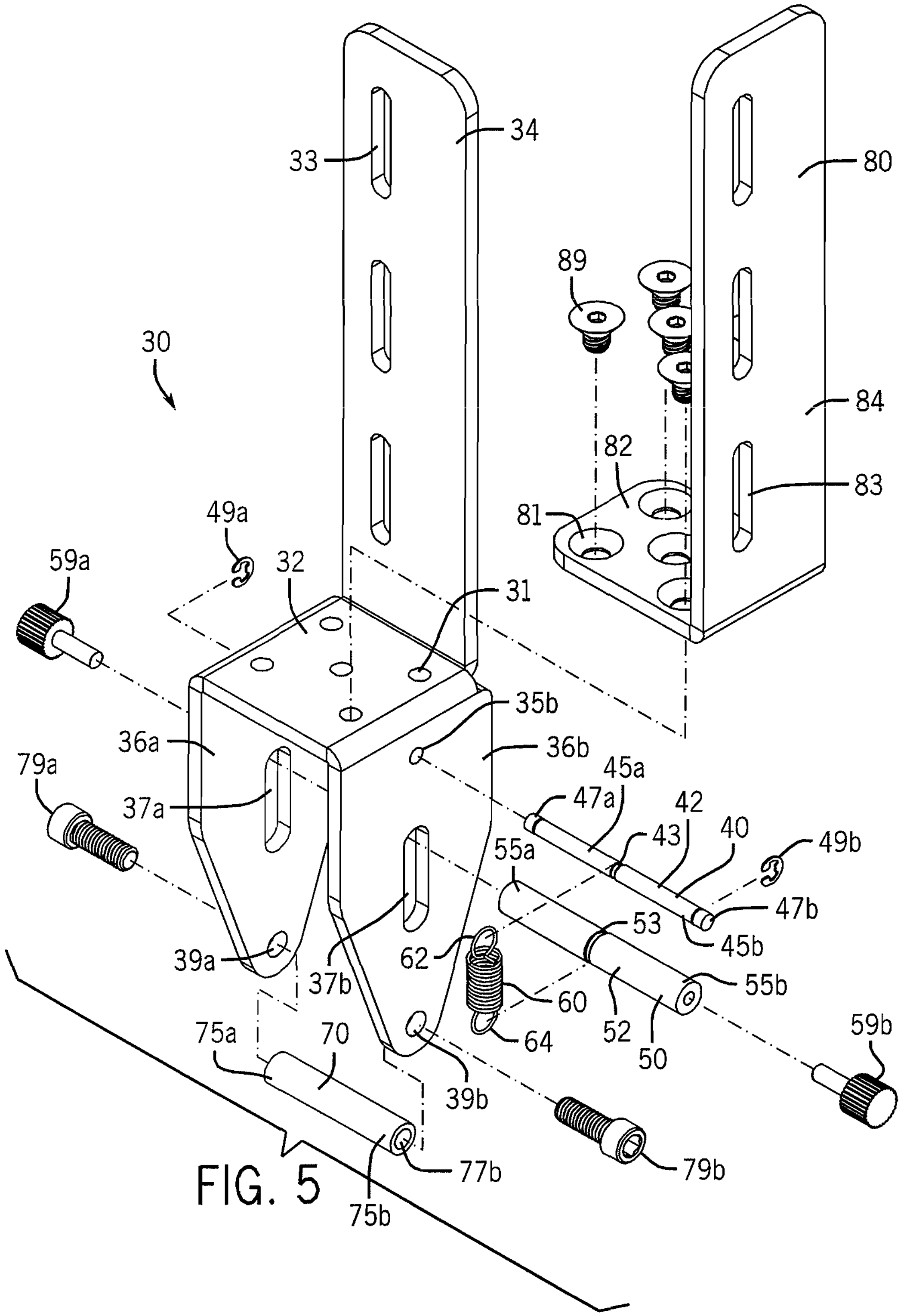
FIG. 5 is an enlarged and exploded top, front and right side perspective view of the saddle coupling of the present invention.

Referring now to FIG. 5, it shows the elements of the saddle coupling 30 in an exploded view. As shown, it will be seen that the coupling 30 comprises a substantially horizontal and planar surface portion 32. A plurality of apertures 31 is defined in that surface portion 32. To each side of the horizontal surface portion 32 is a downwardly-extending and vertically-disposed planar side surface portion 36*a*, 36*b*. Each side surface portion 36*a*, 36*b* comprises a substantially circular upper aperture 35*a*, 35*b* and a substantially circular lower aperture 39*a*, 39*b*, respectively. Disposed between those circular apertures 35*a*, 35*b*, 39*a*, 39*b* is a substantially vertical and slot-like aperture 37*a*, 37*b*, respectively. Extending generally upwardly from the rear side of the horizontal surface portion 32 is a planar rear surface portion 34. The rear surface portion 34 comprising a plurality of vertically-disposed slot-like apertures 33.

FIG. 5 also illustrates a saddle coupling sliding post 80 having a substantially horizontal and planar surface portion 82. A plurality of apertures 81 is defined in that surface portion 82. Extending from the horizontal surface portion 82 is an upwardly-extending and planar side surface portion 84. That side surface portion 84 comprises a plurality of vertically-disposed slot-like apertures 83. A plurality of fasteners 89 is also illustrated. Referring back to FIGS. 3 and 4, it will be appreciated that the sliding post 80 can be secured to the horizontal planar surface portion 32 of the coupling 30 using those fasteners 89 and the apertures 31, 81 defined within the respective elements the use of which secures the sliding post 80 to the coupling 30.

Referring again to FIG. 5, it also illustrates several other components of the assembly 10 that are used with the saddle coupling 30. Specifically, there is shown a screw pin 40, a retracting pin 50, an extension spring 60 and a load pin 70. The screw pin 40, the retracting pin 50 and the load pin 70 are substantially round rod-like structures.

In the preferred embodiment, the screw pin 40 in the assembly 10 of the present invention comprises a centrally-disposed portion 42 which has a circumferentially-defined groove 43 in it. The screw pin 40 further comprises opposing end portions 45*a*, 45*b*. The screw pin 40 is configured such that it is received within the upper apertures 35*a*, 35*b* of the side surface portions 36*a*, 36*b* of the saddle coupling 30. The screw pin 40 is held in a fixed and generally horizontal position and is secured in that position by a pair of C-clips 49*a*, 49*b*. The C-clips 49*a*, 49*b* are received within circumferentially-defined grooves 47*a*, 47*b* that are defined in the end portions 45*a*, 45*b* of the screw pin 40. Other known fastening means are well known in the art and are understood to be suitable replacements for this structural element.

Similarly, the load pin 70, as shown in FIG. 5, is held in a fixed, or stationary, and generally horizontal position and is secured in that position by a pair of fasteners 79*a*, 79*b* that are inserted through the lower apertures 39*a*, 39*b* of the side surface portions 36*a*, 36*b* of the saddle coupling 30. The load pin 70 comprises opposing end portions 75*a*, 75*b*, each end portion 75*a*, 75*b* comprises a fastener-receiving aperture 77*a*, 77*b* defined in it. Again, other known fastening means are well known in the art and are understood to be suitable replacements for this structural element.

Unlike the foregoing pins 40, 70, the retracting pin 50 is intended to be movable within the assembly 10. More specifically, the retracting pin 50 comprises a centrally-disposed portion 52 which has a circumferentially-defined groove 53 in it. The retracting pin 50 further comprises opposing end portions 55*a*, 55*b*. The retracting pin end portions 55*a*, 55*b* are configured to be received and vertically-movable within the slot-like apertures 37*a*, 37*b* of the side surface portions 36*a*, 36*b* of the saddle coupling 30. The retracting pin 50 is, however, restricted to vertical movement by virtue of a pair of fasteners 59*a*, 59*b*. The fasteners 59*a*, 59*b* are received within the end portions 55*a*, 55*b* of the retracting pin 50. Here again, other known fastening means are well known in the art and are understood to be suitable replacements for this structural element as well.

The assembly 10 further comprises the extension spring 60. The spring 60 comprises a top attachment loop 62 and a bottom attachment loop 64. The top attachment loop 62 of the spring 60 is configured to be received and held within the groove 43 that is centrally-disposed in the screw pin 40. The bottom attachment loop 64 is configured to be received and held within the groove 53 that is centrally-disposed in the retracting pin 50. When attached to the pins 40, 50, the spring 60 exerts a force that pulls the pins 40, 50 toward one another. More specifically, however, and because the screw pin 40 is in a fixed or stationary position, the spring 60 is used to urge the retracting pin 50 upwardly within and along the slot-like apertures 37*a*, 37*b*.

Figure 6:
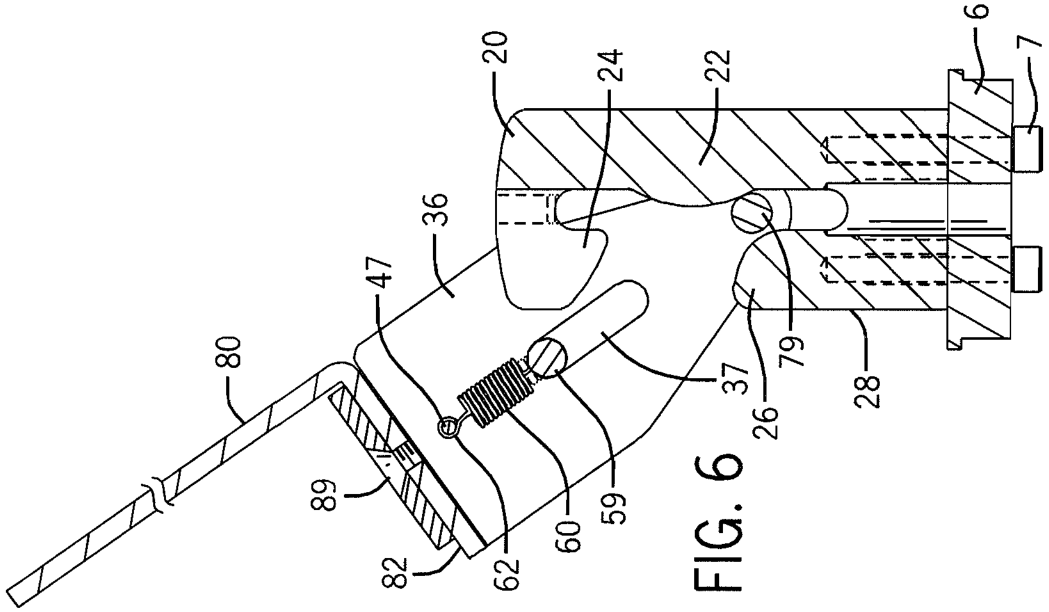
FIG. 6 is a partially sectioned right side elevational view of the saddle coupling prior to its attachment to the saddle base and taken along line 6-6 of FIG. 3.
Figure 7:
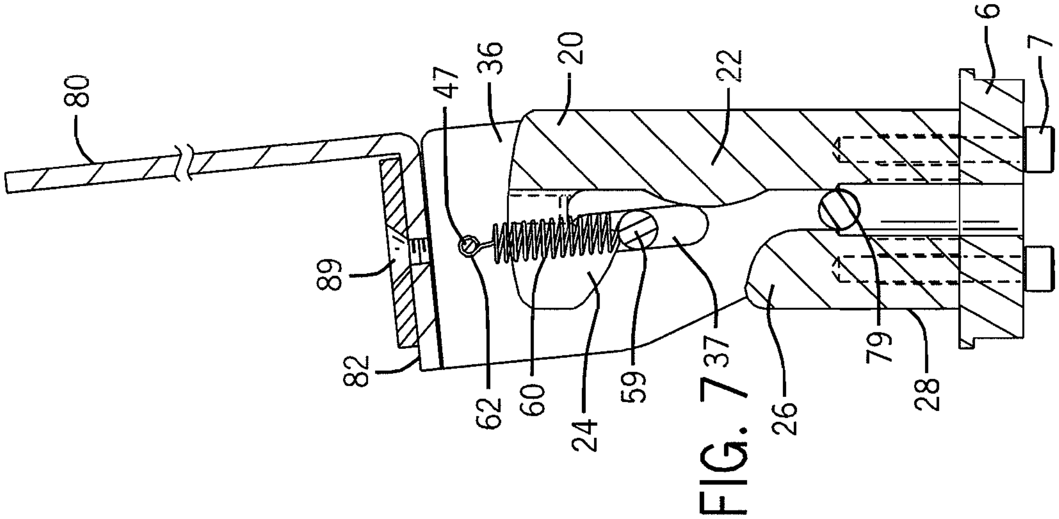
FIG. 7 is the same view as FIG. 6 but showing the saddle coupling in the process of being attached to the saddle base.
Figure 8:
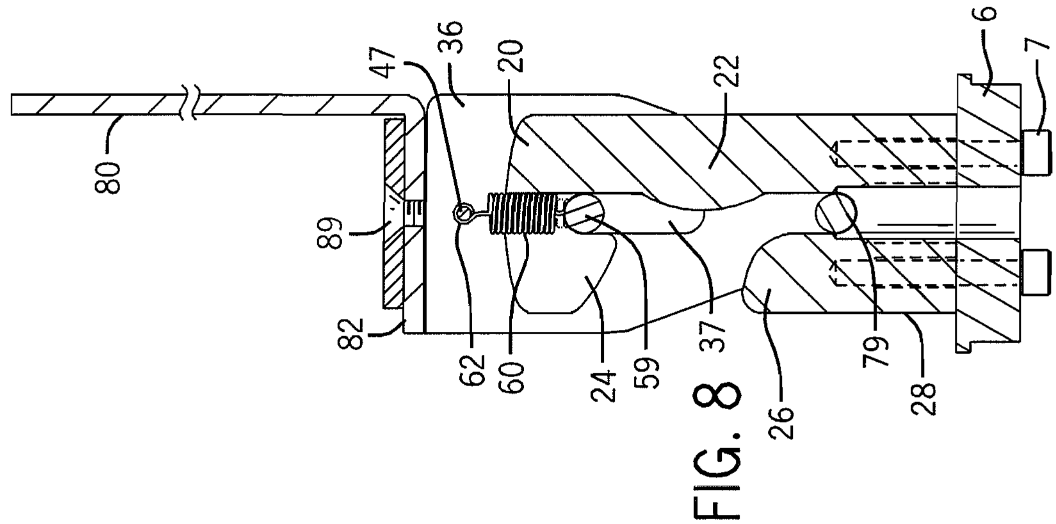
FIG. 8 is the same view as FIGS. 6 and 7 but showing the saddle coupling and saddle base when they are fully attached.

In application, the saddle base 20 is first mounted to the tube cap 6 by means of fasteners 7, as are shown in FIG. 8. Next, a power hand tool 8 is securely attached to the saddle coupling 30 and sliding post 80. At this point, the combined structure of the saddle coupling 30, the sliding post 80 and the attached power hand tool 8 is ready for mounting to the saddle base 20. Reference is now made to FIGS. 6 through 8 which do not, however, show the hand tool 8 for ease of reference. It should also be noted that the saddle coupling could be configured as a structure that could support a plurality of power hand tools 8, such as where two or more collated screw guns or two or more drills are used simultaneously. This would, of course, require modification of the saddle coupling 30 to make it a structure that has the capacity to mount the plurality of such tools 8 in a spaced-apart relation, which is within the scope of the present invention.

As shown in FIG. 6, the saddle coupling 30 is presented to the saddle base 20 at an angle and in such a way that the load pin 70 enters the front face opening 21 of the base 20. The load pin 70 is then introduced into the bottom receiving slot 25. With the load pin 70 in this position, the saddle coupling 30 is then tilted upwardly. This results in the retracting pin 70 engaging the bottom surface 27 of the top base protrusion 24. As shown in FIG. 7, the retracting pin 70 is moved away from the screw pin 40 while force of the extension spring 60 urges the retracting pin 70 into contact with the bottom surface 27 of the top base protrusion 24. As the saddle coupling 30 is moved into a fully-upright position, as shown in FIG. 8, the retracting pin 70 moves into the top receiving slot 23 of the saddle base 20. The spring force of the extension spring 60 maintains the position of the retracting pin 70 and the saddle coupling 30 such that the power hand tool 8 can be moved upwardly and downwardly relative to a ceiling surface (not shown). This is also a "primary" retracting pin 70 retention means. To "swap out" another power hand tool 8 and coupling 30, the reverse of this action is made, the user first applying a downward force on the retracting pin fasteners 59*a*, 59*b* to release the retracting pin 50 from within the top receiving slot 23 of the saddle base 20.

Figure 10:
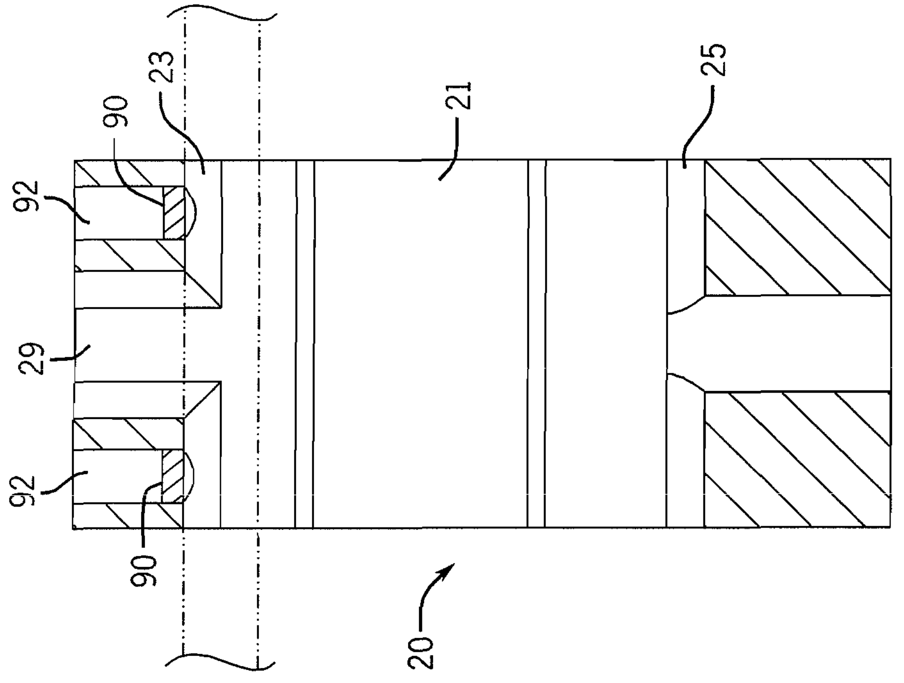
FIG. 10 is a cross-sectioned front elevational view of the saddle base of the assembly taken along line 10-10 of FIG. 9.

To further ensure that the retracting pin 50 remains in position, as shown in FIG. 8, during use of the power hand tool 8, a supplemental or "secondary" retention means is provided. More specifically, a pair of neodymium magnets 90 are inserted into and fastened, preferably by gluing them, within the pair of apertures 92 formed within the top portion of the saddle base 20. See FIGS. 9 and 10. In this fashion, and should the extension spring 60 fail, the retracting pin 70, which is preferably made of a metal material, continues to remain in position within the top receiving slot 23 of the saddle base 20. This built-in redundancy is a safety measure to prevent the power hand tool 8 and the saddle coupling 30 from becoming inadvertently detached from the saddle base 20 during use.

It should also be understood that that certain alternate but functionally equivalent fasteners and other structures may be used in the assembly 10 of the present invention. Specific elements disclosed herein are not to be interpreted as limiting, but rather as a basis for the claims and as a representative basis for teaching one of ordinary skill in the art to employ the present invention.

It should also be understood that the drawings are not necessarily to scale. Instead, emphasis has been placed upon illustrating the principles of the invention.

The details of the invention having been disclosed in accordance with the foregoing, I claim:

1. An assembly for use with at least one power hand tool and a height-adjustable stand, the stand having a vertically-movable upper tube portion and an upper tube cap, the assembly comprising:

- a saddle base, the saddle base being attached to the upper tube cap and comprising:
  - a saddle base body having a front face;
  - a front face opening in the saddle base body, the front face opening comprising a top receiving slot and a bottom receiving slot; and
  - a top base protrusion, said top base protrusion comprising a bottom surface;
- a saddle coupling, the saddle coupling comprising:
  - a horizontal surface portion that overlays the saddle base;
  - a pair of opposing vertical portions extending downwardly from the horizontal surface portion;
  - a fixed screw pin comprising a central circumferential groove;
  - a pair of opposing screw pin apertures defined in the vertical portions for securing the screw pin in a horizontal position between the vertical portions;
  - a vertically-movable retracting pin comprising a central circumferential groove;
  - a pair of opposing retracting pin slots, said slots being disposed vertically within the vertical portions for allowing vertical movement of the retracting pin within the slots;
  - an extension spring having a top attachment loop and a bottom attachment loop such that the top attachment loop is positioned within the groove of the screw pin and the bottom attachment loop is positioned within the groove of the retracting pin;
  - a fixed load pin;
  - a pair of opposing load pin apertures defined in the vertical portions for securing the load pin in a horizontal position between the vertical portions;
  - a rear vertical surface portion extending upwardly from the horizontal portion; and
  - a plurality of vertically-disposed slots defined in the rear vertical surface portion;
  - wherein the at least one power hand tool is mounted to the saddle coupling and the assembly is vertically movable to elevate the assembly and the at least one power hand tool.

2. The assembly of claim 1 wherein the saddle coupling further comprises a saddle sliding post that is attached to the horizontal surface portion of the saddle coupling, the sliding post comprising a vertical planar member having a plurality of apertures defined in it.

3. The assembly of claim 2 wherein the retracting pin is made of a ferrous metal material and the saddle base comprises magnets fastened within the saddle base at the top receiving slot.

* * * * *